W. L. Potter.
Canal Vent Gate.
Nº 1,310.   Patented Aug. 31, 1839.
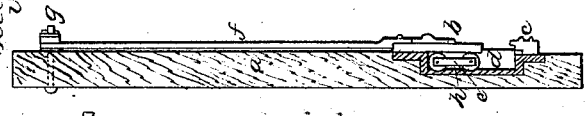
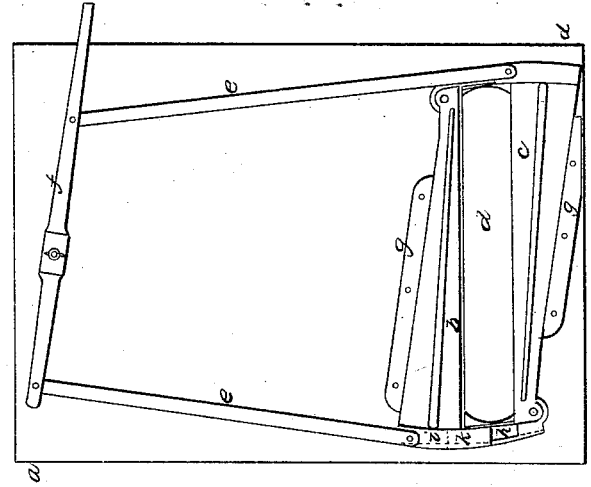
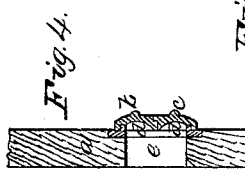
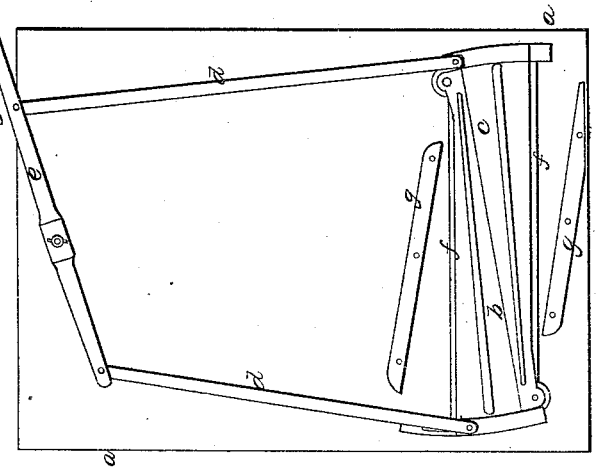

UNITED STATES PATENT OFFICE.

WM. L. POTTER, OF CLIFTON PARK, NEW YORK.

WICKET-GATE FOR CANAL-LOCKS.

Specification of Letters Patent No. 1,310, dated August 31, 1839.

*To all whom it may concern:*

Be it known that I, WILLIAM L. POTTER, of Clifton Park, in the county of Saratoga and State of New York, have invented a new and Improved Gate for Letting in and Discharging Water from Lift-Locks on Canals; and I do hereby declare that the following is a full and exact description thereof, and to enable others skilled in the art to make and use my invention I will proceed to explain its construction and operation.

The lower part of the main gate is constructed with an opening or vent hole of sufficient width to admit the requisite quantity of water to pass through it. (See $d$, Figure 2.) This opening is closed by two small vent gates or wickets of a triangular form, and the broad end of one is placed by or in juxtaposition with the narrow end of the other, in such a manner that they cover the whole opening, as may be seen by inspecting Fig. 1 of the accompanying drawing. The narrow end of each wicket, is made stationary by a pivot or bolt, on which it moves or vibrates by means of a lever at the upper part of the main or lock gate. This lever is connected with the wickets by two bars of iron, which are attached to the broad end of each wicket and also to the lever at each side of the pivot on which it vibrates, so that one wicket balances the other, and thereby uniformity and ease of operation is produced. When one end of the lever is made to descend, it will cause the broad end of one wicket to fall and the broad end of the other to rise at the same time, and thus produce an entire opening. By reversing the operation of the lever, the aforesaid opening will be completely closed.

To prevent wear and friction, the wickets are made to open and shut without coming in contact with the main gate, by means of rollers placed under the broad end of each wicket for that purpose. There are two rollers for each wicket fixed in a movable frame at a given distance apart. The frame is made of a circular form to correspond with the sweep of the wicket in rising and falling. (See $d$—$e$, Fig. 3.) The rollers are secured in their places in the frame by bolts or pins, on which they revolve. The frames containing the rollers, as aforesaid, are placed in cast-iron boxes of sufficient length to admit the rollers to roll as far as may be necessary in opening and closing the wickets. In consequence of the rollers moving up and down with the wickets, and not revolving in a stationary frame, the whole weight which is caused by the lateral pressure of the water will fall exclusively on the circumferences of the rollers. To keep the rollers in their proper places under the wickets in opening and shutting, when there is no lateral pressure on them, a bolt or elevator is attached to the wickets in such a manner as to move them when they open and shut. (See $h$, Fig. 3.) These rollers when the locks are large and deep, cause the gates to work with great ease, and add to their durability.

The narrow end of each wicket is supported by a washer, or is made to project in the form of a circle around the pivot on which it moves. The more effectually to prevent the water from passing through or under the wickets when closed, the oblong opening aforesaid is surrounded by a frame of cast-iron, a part of which is made to project a little above the surface of the main gate to which it is fastened. There is a similar projection on the edge and end of the under part of each wicket, so that when the wickets are closed the projecting or prominent parts of the wickets and frame meet and produce a joint. The under part of the wickets are made concave to prevent them from rubbing the frame when they pass over it. The frame is made whole or in parts, and the boxes which contain the rollers are so constructed as to form or constitute the ends of the frame. The wickets may be made of wood, of cast-iron, or wrought iron, or of any other metallic substance that may be deemed expedient.

What I claim as my invention, and desire to secure by Letters Patent is—

The combination of the two wickets in the manner and for the purpose herein described.

WILLIAM L. POTTER.

Witnesses:
STEPHEN H. JOHNSON,
RUFUS M. PERRY.